United States Patent [19]

Nishimoto

[11] Patent Number: 4,758,070
[45] Date of Patent: Jul. 19, 1988

[54] VARIABLE FOCAL LENGTH LENS

[75] Inventor: Yoshifumi Nishimoto, Yokohama, Japan

[73] Assignee: Canon Kabushiki Kaisha, Tokyo, Japan

[21] Appl. No.: 863,833

[22] Filed: May 16, 1986

[30] Foreign Application Priority Data

May 31, 1985 [JP] Japan .................. 60-119434

[51] Int. Cl.⁴ ..................... G02F 1/03; G02F 1/29
[52] U.S. Cl. ......................... 350/379; 350/387; 350/393
[58] Field of Search ............... 350/379, 387, 393, 411

[56] References Cited

U.S. PATENT DOCUMENTS

| | | | |
|---|---|---|---|
| 3,520,592 | 7/1970 | Leib et al. | 350/388 |
| 3,532,891 | 10/1970 | Simmons et al. | 350/393 |
| 3,658,409 | 4/1972 | Shimbo et al. | 350/382 |
| 3,819,939 | 6/1974 | Rahiff | 350/387 |

FOREIGN PATENT DOCUMENTS 133017 10/1980 Japan ........................ 350/393

OTHER PUBLICATIONS

Feldman, A., "Bistable Optical Systems Based on a Pockels Cell", Optics Letters, 4-1979, pp. 115-117.
Kubota et al., "Electro-Optical Polarisation Control on Single-Mode Optical Fibres" Electronics Letts. 7-1980, p. 573.

*Primary Examiner*—William H. Punter
*Attorney, Agent, or Firm*—Fitzpatrick, Cella, Harper & Scinto

[57] ABSTRACT

A variable focal length lens has a lens system having optical anisotropy, a polarization plane control device for changing the direction of polarization of a light beam on the lens system. A detector is provided for detecting the direction of polarization of the light beam emergent from the lens or the polarization plane control device which, by a signal, controls the polarization plane control device so that only a light beam of desired direction of polarization emerges from the lens.

6 Claims, 2 Drawing Sheets

VARIABLE FOCAL LENGTH LENS

BACKGROUND OF THE INVENTION

1. Field of the Invention

This invention relates to a variable focal length lens, and in particular to a variable focal length lens in which the relative relation between a double refraction lens and the plane of polarization of a light beam incident on the double refraction lens is varied to thereby obtain a desired focal length.

2. Related Background Art

A change of the focal length of a variable focal length optical lens system called a zoom lens has heretofore been accomplished by moving a plurality of lens groups each comprising a plurality of single lenses in the optical lens system to thereby vary the spacing between those lens groups. In such a lens system, however, a movable mechanism for moving the lens groups has been necessary and as a result, performances such as rapid change of the focal length, compactness and low cost have not been sufficiently satisfied and thus, the advent of a lens system in which those performances are enhanced has been desired.

On the other hand, variable focal length lenses which are compact and have few or no movable portions and thus have solved the above-noted problems are proposed in U.S. Pat. No. 3,520,592 and our Japanese Laid-Open Patent Application No. 10224/1985. These patents discloses a variable focal length lens comprising a lens formed of a solid having optical anisotropy, and means for varying the direction of polarization of a light incident on the lens.

FIG. 1 of the accompanying drawings is a schematic view showing an example of the variable focal length lens proposed in Japanese Laid-Open Patent Application No. 10224/1985.

In FIG. 1, reference numeral 1 designates a polarizing plate, reference numeral 2 denotes a polarization plane rotating element, reference numeral 3 designates a double refraction lens, reference numeral 4 denotes a power source, and reference numeral 5 designates a switch.

The polarization plane rotating element 2 rotates the plane of polarization of transmitted light by the application of an electric field thereto, and comprises, for example, a Z-cut plate or the like of single crystal KH$_2$PO$_4$ provided with transparent electrodes on the opposite sides thereof.

The double refraction lens 3 is formed so that, for example, the optical axis (Z-axis) of crystal is orthogonal to the principal axis of the lens, and is so disposed that the Z-axis is parallel to the plane of the drawing sheet. Accordingly, the refractive index of the double refraction lens 3 is such that the refractive index for the direction of polarization perpendicular to the principal axis of the lens and parallel to the plane of the drawing sheet is normal ray refractive index $n_0$ and the refractive index for the direction of polarization perpendicular to the principal axis of the lens and perpendicular to the plane of the drawing sheet is abnormal ray refractive index $n_e$.

In FIG. 1, the light linearly polarized by the polarizing plate 1 enters the double refraction lens 3 without changing its direction of polarization when the switch 5 is open, and thus, the light passing through this lens experiences the refractive index $n_0$ and has a focal length $F_1$. At this time, the direction of polarization of the transmitted light is the same as that of the first-mentioned incident light, that is, the direction parallel to the plane of the drawing sheet. In contrast, when the switch 5 is closed and a half wavelength voltage is being applied, the direction of polarization is changed to a direction rotated by 90° relative to the incident light, i.e., a direction perpendicular to the plane of the drawing sheet, by the action of the polarization plane rotating element 2. Consequently, the light passing through the double refraction lens 3 has a focal length $f_2$ which is determined by the refractive index $n_e$ for that direction.

The variable focal length lens thus changing the direction of polarization has an advantage that it can vary its focus over a wide range.

However, the electro-optical material used for the polarization plane rotating element 2, etc. is usually liable to be affected by temperature, humidity, etc. or the electro-optical material itself often has hysteresis and therefore, such material has suffered from a disadvantage that the direction of polarization of the light incident on the double refraction lens is fluctuated by the fluctuation of the half wavelength voltage applied to this electro-optical material and the lens performance is thus deteriorated. Not only the electro-optical crystal but also magneto-optical crystal or elastic material used for the polarization plane rotating element is liable to be subjected to disturbance and therefore, it is difficult to always rotate the plane of polarization normally.

Also, a lens selecting its focal length by rotating a double refraction lens relative to a predetermined linearly polarized light beam as disclosed in U.S. Pat. No. 3,520,592, or a lens selecting its focal length by rotating a polarizing plate or the like to change the plane of polarization of the incident light beam and direct the light to a double refraction lens has suffered from disadvantages similar to those of said lens having the polarization plane rotating element. That is, it has been difficult to accurately rotate the double refraction lens or the polarizing plate by a desired angle to thereby accomplish switching and therefore, it has been impossible to maintain the relation between the double refraction lens and the plane of polarization of the incident light beam in a desired relation and as a result, it has been impossible to accomplish accurate control of the focal length.

SUMMARY OF THE INVENTION

It is an object of the present invention to eliminate the above-noted disadvantages peculiar to the prior art and to provide a variable focal length lens which can always be driven in the best condition and in which the relative relation between a double refraction lens and the plane of polarization of the incident light can be accurately made into a desired relation.

To achieve the above object, the variable focal length lens according to the present invention is a variable focal length lens in which the direction of polarization of the incident light incident on a lens having optical anisotropy, relative to said lens, is changed to thereby vary the focal length, characterized by control means for accurately determining said relative direction of polarization.

Said control means detects the fluctuation of the polarized state of light caused by a polarization plane rotating element or the like being subjected to disturbance, or the deviation from a desired relation of the direction of polarization of the incident light relative to the double refraction lens caused by the inaccuracy of the control of the rotation of the polarizing plate or the double refraction lens, and controls on the basis of the detected information the polarization plane rotating element or a mechanism for rotating the polarizing plate or the double refraction lens, and the present invention is designed so as to form a feedback loop in a variable focal length lens and to always perform a normal lens function.

Further features of the present invention are described in the following detailed description of some embodiments of the invention.

DESCRIPTION OF THE PREFERRED EMBODIMENTS

Figure 1:
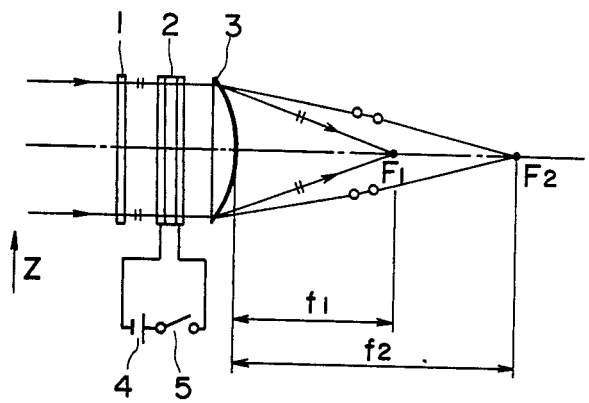
FIG. 1 is a schematic view showing an example of the variable focal length lens according to the prior art.
Figure 2:
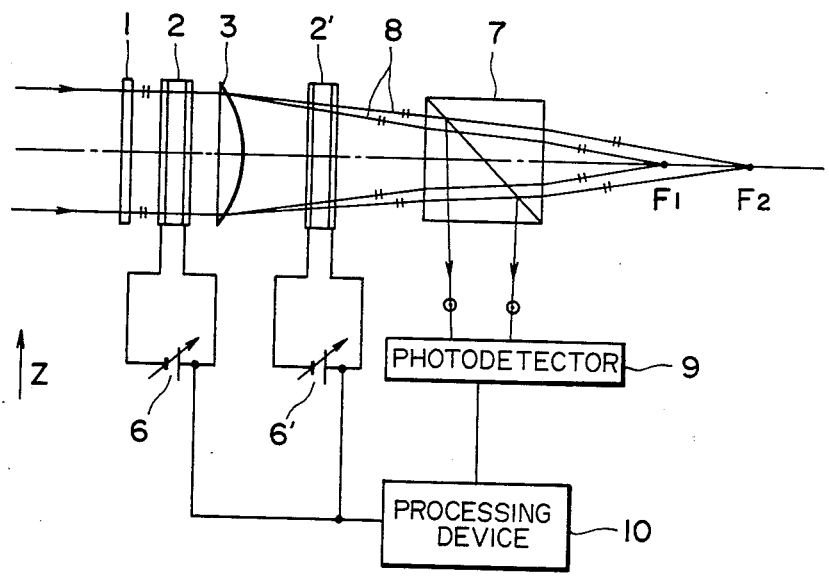
FIG. 2 is a schematic view showing an embodiment of the variable focal length lens according to the present invention.

Referring to FIG. 2 which shows an example of the construction of a variable focal length lens according to the present invention, members similar to those in FIG. 1 are given similar reference numerals Reference numeral 2' designates a polarization plane rotating element, reference numerals 6 and 6' denote variable voltage sources, reference numeral 7 designates a polarizing beam splitter, reference numeral 8 denotes an emergent light, reference numeral 9 designates a photodetector, and reference numeral 10 denotes a processing device.

As in the prior art described with reference to FIG. 1, a light linearly polarized through a polarizing plate has its direction of polarization changed over by applying an electric field to the polarization plane rotating element 2. Accordingly, the light passed through the polarization plane rotating element 2 enters a double refraction lens 3 to vary the focal length thereof. In the present variable focal length lens, the direction of polarization of the emergent light 8 is normally maintained instant by the polarization plane rotating element 2' disposed rearwardly of the double refraction lens 3 and the emergent light 8 having a predetermined direction of polarization is imaged through the polarizing beam splitter 7. The direction of this polarizing beam splitter 7 is made coincident with the direction of polarization of the emergent light in its normal state, and when the direction of polarization of the emergent light 8 fluctuates and, as shown in the drawing two light beams come through the double refraction lens 3 from P-polarizing light and S-polarizing light effected by polarization plane rotating element 2. These two light beams substantially condensed at $F_1$ and $F_2$ are emerging, part of the emergent light, i.e., the light beam condensed at $F_1$, is deflected by the polarizing beam splitter and enters the photodetector 9.

That is, when the half wavelength voltage of the voltage source 6 is varied by temperature and humidity or the hysteresis or the like of the polarization plane rotating element 2, the retardation occurring in the polarization plane rotating element 2 deviates from the ½ wavelength and therefore, the light entering the double refraction lens 3 generally becomes elliptically polarized and thus forms two different focus positions, and the lens performance is deteriorated. Accordingly, the quantity of light reading the photodetector 9 increases with an increase in the amount of fluctuation of the half wavelength voltage and therefore, by imparting a control signal to the voltage sources 6 and 6' through the processing device 10 to minimize the quantity of light detected by the photodetector 9, the voltage applied to the polarization plane rotating elements 2 and 2' is controlled and an optimum voltage is normally applied thereto.

In the present embodiment, application of a variable focal length lens using a set of polarization plane rotating elements and a double refraction lens has been shown, but it is apparent that the present invention is also applicable to an apparatus in which a plurality of polarization plane rotating elements and double refraction lenses are arranged along the optic axis and the range of the variable focal length is widened. Further, the polarization plane rotating elements used in the present embodiment utilize electrooptical crystal such as $KH_2PO_4$, but alternatively, use may be made of elements utilizing the photoelastic effect to rotate the plane of polarization by the double refraction provided by a mechanical load, or a so-called Faraday rotational element utilizing the magneto-optical effect to rotate the plane of polarization. Also, the double refraction lens may be any shape, and may be determined in conformity with the use thereof, and a lens system constructed by combining conventional lenses may also be used.

Also, in the above-described embodiment, the fluctuation component is directed to the photodetector from the light elliptically polarized through the polarization plane rotating elements and beam splitter disposed rearwardly of the double refraction lens, whereas the polarization plane rotating elements need not always be used, but a similar function can be performed also by changing the direction of the beam splitter and the position of the photodetector in cooperation with the direction of polarization changed by the front polarization plane rotating element with the rear one 2'. Further, the processing device may be of various constructions using a conventional analog circuit or a microcomputer, and may employ any means. The means for detecting the polarized state need not always be disposed rearwardly of the double refraction lens, but may be disposed at any position if it is a means which can be disposed at a predetermined position rearward of the polarization plane rotating elements to form a feedback loop.

Figure 3:
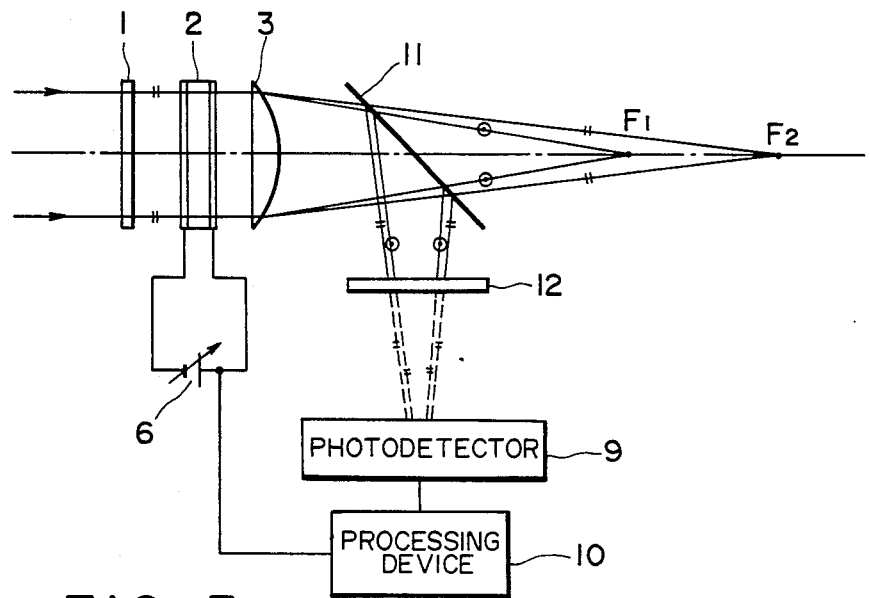
FIG. 3 is a schematic view showing another embodiment of the variable focal length lens according to the present invention.

FIG. 3 is a schematic view showing another embodiment of the variable focal length lens according to the present invention. In FIG. 3, members similar to those in FIG. 2 are given similar reference numerals. Reference numeral 11 designates a half-mirror, and reference numeral 12 denotes a polarizing plate. The polarizing plate 12 is disposed in one of optical paths separated by the half-mirror 11, and the light beam following this optical path is received by the photodetector 9 through the polarizing plate 12.

Again in the present embodiment, the light linearly polarized through the polarizing plate 1 has its direction of polarization changed over by applying an electric field to the polarization plane rotating element 2. Accordingly, the light passed through the polarization plane rotating element 2 enters the double refraction lens 3 and changes the focal length thereof, i.e., the condensing position. In the embodiment of FIG. 2, the light beam emergent from the double refraction lens is further made into a predetermined linearly polarized light by the polarization plane rotating element 2' and the amount of deviation from the predetermined linearly polarized light is detected by a combination of the polarizing beam splitter 7 and the photodetector 9, whereas in the present embodiment, part of the light beam emergent from the double refraction lens 3 is directed to the polarizing plate 12 through the half-mirror 11. The direction of polarization of the polarizing plate 12 is set, for example, to a direction parallel to the plane of the drawing sheet. Assume that the direction of polarization of a light beam to be condensed at the focus $F_2$ (hereinafter referred to as the P light beam) is parallel to the plane of the drawing sheet in the normal state, and a light beam condensed at the focus $F_1$ (hereinafter referred to as the S light beam), because the polarization plane rotating element 2 is affected by the ambient temperature or the like and the P light beam is elliptically polarized slightly emerges from the double refraction lens 3. Then, the light beam reflected by the half-mirror 11 contains the P light beam and the S light beam, and the polarizing plate 12 passes only the P light beam therethrough and the photodetector 9 receives and detect the quantity of light of that light beam. Here, with the quantity of light of the P light beam obtained through the half-mirror 11 and the polarizing plate 12 in the normal state, that is, in the state in which the light is condensed at the point $F_2$, being as a reference data I max, the quantity-of-light data obtained by the photodetector 9 is compared with the reference data I max by the processing device 10, whereby a control signal can be supplied to the variable voltage source 6 of the polarization plane rotating element 2 so that the two data coincide with each other. Conversely, the S light beam in its normal state has a direction of polarization perpendicular to the plane of the drawing sheet, and even when the S light beam and the P light beam emerge from the double refraction lens 3 because the polarization plane rotating element 2 is affected by the ambient temperature or the like and the S light beam is elliptically polarized, the photodetector receives only the P light beam through the polarizing plate 12 and detects 0 the quantity of light thereof Accordingly, in this case, the quantity of light of the P light beam in the normal state is substantially zero ($I_0$) and therefore, a control signal is supplied to the variable voltage source 6 of the polarization plane rotating element 2 so that the quantity-of-light data obtained by the photodetector 9 becomes zero ($I_0$) That is, if a command concerning the switching (the P light beam or the S light beam) of the plane of polarization supplied to the polarization plane rotating element 2 is to be executed through the processing device 10, presetting is effected such that, for example, where it is desired to obtain the P light beam (condense the light at the focus $F_2$), a signal for producing the P light beam is supplied to the variable voltage source 6 and the quantity-of-light data obtained from the photodetector 9 is compared with I max and that where it is desired to obtain the S light beam (condense the light at the focus $F_1$), a signal for producing the S light beam is supplied to the variable voltage source 6 and the quantity-of-light data obtained from the photodetector 9 is compared with $I_0$. This presetting may be accomplished by programming in advance, or by providing two comparators for comparing the quantity-of-light data with I max and $I_0$, and setting them so as to be changed over for the respective light beams, i.e., the P light beam and the S light beam.

According to the present embodiment, the polarization plane rotating element 2' in the embodiment shown in FIG. 2 becomes unnecessary and the construction becomes simpler. Moreover, the use of the half-mirror instead of the polarizing beam splitter can reduce the cost at which the apparatus is constructed. The position at which the half-mirror is disposed is not limited to that shown in FIG. 3, but the half-mirror may be disposed between the polarizing plate 1 and the double refraction lens 3 to thereby take out some of the light beam. Also the reflectance of the half-mirror 11 may be suitably determined with the light-receiving sensitivity or the like of the photodetector 9 taken into account.

Figure 4:
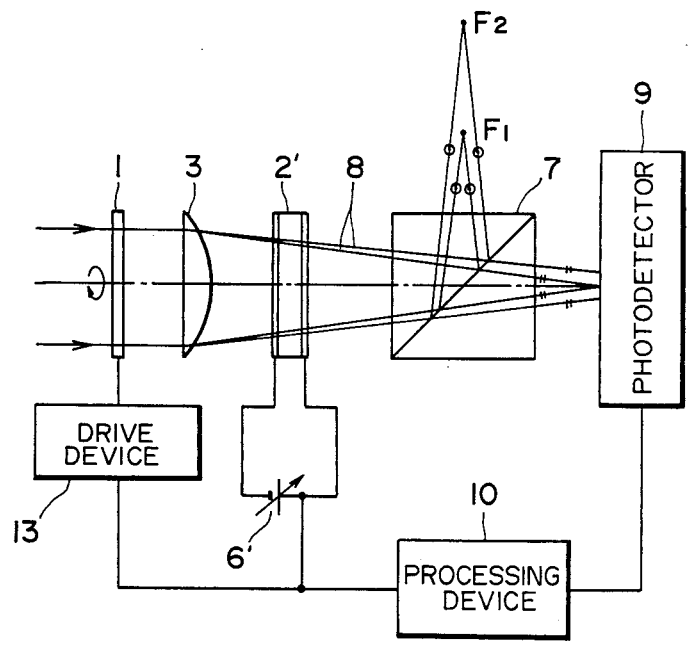
FIG. 4 is a schematic view showing still another embodiment of the variable focal length lens according to the present invention.

FIG. 4 is a schematic view showing still another embodiment of the variable focal length lens according to the present invention. In FIG. 4, members similar to those in FIG. 2 are given similar reference numerals, and reference numeral 13 designates a drive device. The polarizing plate 1 is rotatable about the optic axis, and is rotated by the drive device 13 such as a motor, whereby the direction of polarization is changed and a predetermined polarized component is taken out from the incident light beam. In the present embodiment, it is to be understood that switching is effected so that the direction of polarization of the polarizing plate 1 changes by 90° between a direction parallel to the plane of the drawing sheet and a direction perpendicular to the plane of the drawing sheet.

In the embodiments shown in FIGS. 2 and 3, the plane of polarization of the light entering the double refraction lens 3 is controlled by the polarization plane rotating element 2, whereas in the present embodiment, the polarizing plate 1 is rotated to thereby selectively take out light beams of polarized components orthogonal to each other, namely, the P light beam and the S light beam. The principle with which the focal length is varied is similar to that described in connection with the previous embodiments and therefore need not be described herein Also, the fluctuation of the plane of polarization of the light beam attributable to the inaccuracy of the control of the rotation of the polarizing plate 1 and to the variation in the characteristic of the polarization plane rotating element 2' is detected by a combination of the polarizing beam splitter 7 and a photodetector as in the embodiment of FIG. 2, and normal operation can be performed by supplying a control signal to the device 13 and the variable voltage source 6' through the processing device 10. In the embodiment of FIG. 2, the light beam reflected by the polarizing beam splitter 7 is monitored by the photodetector 9, whereas in the present embodiment, the light beam transmitted through the polarizing beam splitter 7 is monitored by the photodetector 9. Accordingly, the light beam passing through the polarization plane rotating element 2' is controlled so as to be all polarized in a direction perpendicular to the plane of the drawing sheet.

In the present embodiment, the polarizing plate 1 is rotated to thereby selectively take out lights of predetermined polarized components, but alternatively, the direction of polarization of the polarizing plate 1 may be fixed and the double refraction lens 3 may be rotated to thereby relatively vary the plane of polarization of the light entering the double refraction lens 3. Also, the fluctuation of the plane of polarization may be detected by the method as described in connection with the embodiment of FIG. 3.

Also, as the drive device 13 for rotating the polarizing plate 1, use may preferably be made of one which can effect switching by a desired angle, e.g., 90°, and which can accomplish rotation adjustment of a minute angle.

As described above, the variable focal length lens according to the present invention can always keep the relative relation between the plane of polarization of the light beam entering the double refraction lens and the double refraction lens in a desired relation by detecting the fluctuation from the reference state of the plane of polarization of the light beam entering the double refraction lens, and can accurately vary the focal length thereof in the best state. Thus, according to the present invention, there can be provided a variable focal length lens which will perform a sufficient function even if applied to the auto-focusing mechanism or the like of an optical disk or the like and which is also applicable to other various optical instruments.

What I claimed is:

1. A variable focal length optical system comprising:
   lens means having optical anisotropy;
   first polarization control means for changing the direction of polarization of a light beam incident on said lens means, relative to said lens means, in accordance with an input signal to said first polarization control means, so as to change the focal length of said optical system;
   second polarization control means for changing the direction of polarization of a light beam emergent from said lens means in accordance with an input signal to said second polarization control means, so as to maintain the direction of polarization of a light beam emergent from said optical system in a predetermined direction;
   beams splitting means for separating the light beam from said second polarization control means into a light beam polarized in said predetermined direction and a light beam polarized in a direction otehr than said predetermined direction, said beam splitting means being disposed in the optical path of the light beam from said second polarization control means;
   light receiving means for receiving the light beam polarization in the direction other than said predetermined direction to make an output signal; and
   signal control means for controlling said input signals supplied to said first and second polarization control means so as to maximize the intensity of the light beam polarized in said predetermined direction.

2. An optical system according to claim 1, wherein said beam splitting means includes a polarization beam splitter which transmits therethrough the light beam polarized in said predetermined direction but reflects the light beam polarized in the direction other than said predetermined direction.

3. An optical system according to claim 1, wherein said beam splitting means includes polarization beam splitter which reflects the light beam polarized in said predetermined direction but transmits therethrough the light beam polarized in the direction other than said predetermined direction.

4. An optical system according to claim 1, wherein each of said first and second polarization control means includes an electro-optical crystal and means for applying an electric field to said crystal and said signal control means controls the intensity of said electric field so that the polarization plane of the light beam incident on each of said first and second polarization control means is accurately rotated a predetermined angle.

5. An optical system according to claim 1, wherein said signal control means controls the input signals supplied to said first and second polarization control means, separately.

6. An optical system according to claim 5, wherein each of said first and second polarization contorl means includes an electro-optical crystal, and an electrode for applying an electric field to said crystal and a variable voltage source, and said voltage source is driven in accordance with each of said input signals supplied to said first and second polarization control means.

* * * * *

UNITED STATES PATENT AND TRADEMARK OFFICE
CERTIFICATE OF CORRECTION

PATENT NO. : 4,758,070

DATED : July 19, 1988

INVENTOR(S) : YOSHIFUMI NISHIMOTO

It is certified that error appears in the above-identified patent and that said Letters Patent is hereby corrected as shown below:

Column 1, line 30, "discloses" should read --disclose--.

Column 3, line 31, "numerals" should read --numerals.--.

Column 4, line 4, "reading" should read --reaching--;

line 42, "with" should read --2 without--.

Column 5, line 25, "detect" should read --detects--;

line 44, "detects 0" should read --detects--;

line 45, "thereof" should read --thereof.--;

line 51, "$(I_0)$" should read --$(I_0)$.--.

UNITED STATES PATENT AND TRADEMARK OFFICE
CERTIFICATE OF CORRECTION

PATENT NO.   :   4,758,070
DATED        :   July 19, 1988
INVENTOR(S)  :   YOSHIFUMI NISHIMOTO It is certified that error appears in the above-identified patent and that said Letters Patent is hereby corrected as shown below:

Column 7, line 41, "otehr" should read --other--.

Column 8, line 18, "includes" should read --includes a--.

Signed and Sealed this

Thirteenth Day of December, 1988

Attest:

DONALD J. QUIGG

Attesting Officer         Commissioner of Patents and Trademarks